May 19, 1925.
T. EWAN
1,538,389
MANUFACTURE OF ALKALI METALS
Filed March 31, 1924
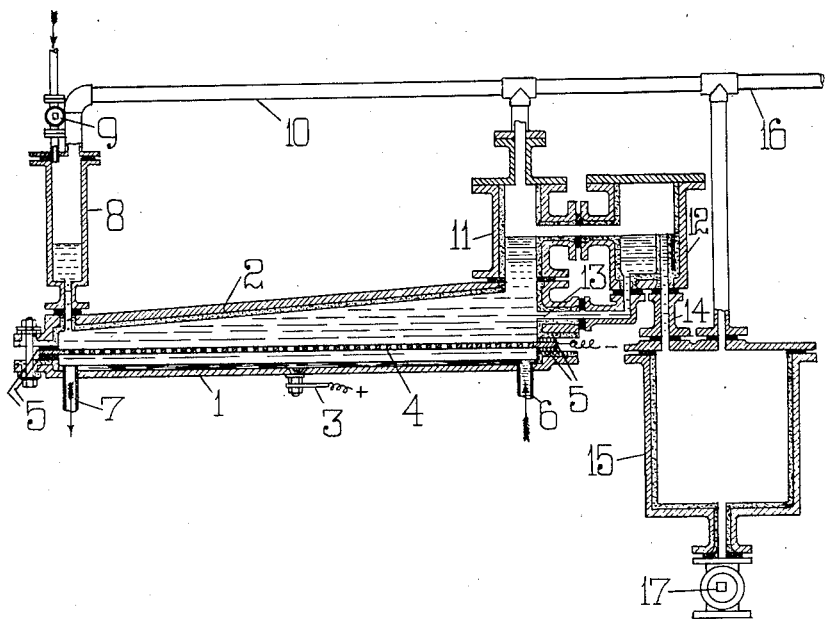
Inventor.
Thomas Ewan
by Knight Bro
Attorneys Patented May 19, 1925.

1,538,389

UNITED STATES PATENT OFFICE.

THOMAS EWAN, OF GLASGOW, SCOTLAND.

MANUFACTURE OF ALKALI METALS.

Application filed March 31, 1924. Serial No. 703,102.

*To all whom it may concern:*

Be it known that I, THOMAS EWAN, a subject of the King of Great Britain, residing in Glasgow, in the county of Lanark, Scotland, have invented certain new and useful Improvements in or Relating to the Manufacture of Alkali Metals, of which the following is a specification.

This invention relates to an improvement the manufacture of alkali metals.

One object of the invention is to provide an improved method of obtaining alkali metals from amalgams thereof. A further object is to obtain alkali metals from aqueous solutions of their salts by making an amalgam and then treating that amalgam as hereafter defined. Further objects will be apparent from the description hereafter and the scope of the invention will be defined in the appended claims.

I find that it is possible to obtain sodium (or other alkali metal) in the form of a concentrated solution in an inert solvent from an amalgam (advantageously from a very dilute amalgam) by using the amalgam as anode in the electrolysis of an inert electrolytic solution at low temperature i. e. at temperatures much lower than 100° C. The preferred range is from —30° C. to +30° C. which is far below those which can be obtained by the use of fused salts. The solvent I prefer to use is liquid anhydrous ammonia but the invention is not limited thereto as other solvents may be used provided that they yield electrolytic solutions inert to sodium or other alkali metal, that is, the solutions must not react with the sodium or alkali metal to an extent which will prevent isolation of the metal therefrom. Liquid methylamine is an example of an alternative solvent. Many organic liquids are excluded because they react with sodium or alkali metal. Salts in the fused condition are unsuitable because their melting points are too high and by the expression "volatile solvent" I exclude such fused salts.

The electrolyte may be any sodium (or alkali metal) salt which is soluble in the solvent and which is inert (in the above defined sense) to sodium (or other alkali metal) for example, sodium (or other alkali metal) cyanide.

The invention includes the use of certain solutions in which alkali metals are substantially insoluble but which can be used to remove them from their amalgams. Solutions in the liquefied gas may be thus drawn off continuously to yield the metals by evaporation. The whole process of isolation of the metals may be made continuous.

The invention also includes a suitable apparatus as defined in the claims.

My experiments lead to the conclusion that solutions of alkali metal salts in liquid anhydrous ammonia may be divided into three groups:—

(I) Those in which the corresponding metal dissolves; the solution may or may not consist of two phases.

(II) Those in which the metal is insoluble or very sparingly soluble and with which it co-exists in the form of a solution of the metal in ammonia free or nearly free from salts.

(III) Those in which the metal is substantially insoluble and with which it co-exists in the solid form.

When a readily soluble sodium salt for example, is added in increasing quantities to a solution of sodium in ammonia a point can be reached at which the solution separates into two distinct layers, the lower one consisting of a solution of the sodium salt in ammonia containing mere traces of free sodium and the upper one containing substantially the whole of the sodium dissolved in ammonia and almost free from the salt. Further increase of the concentration of the salt increases the concentration of the sodium solution in equilibrium with it until saturation is reached; beyond this point solid sodium separates out.

Solutions belonging to the first group (those in which the metal dissolves more or less readily) are of little value in the manufacture of the metals because the metal which is formed at the cathode dissolves more or less readily in the electrolyte and is reabsorbed therefrom by the mercury at the anode. Further any metal which escapes reabsorption can only be removed from the cell together with the dissolved salts from which it must be separated in a subsequent operation, a very undesirable complication of the process. The more nearly the solutions approach the border line which divides them from group two, the less do these objections hold good. When using dilute solutions I prefer to use a diaphragm to hinder contact of dissolved sodium with mercury.

The solutions of the second group (those from which alkali metal separates almost completely in the form of a solution in ammonia) are the preferred electrolytes for the purposes of this invention, since the metal solutions float on the surface of the salt solutions and are thereby effectively kept out of contact with the anode amalgam. Being liquid, they are readily removed from the electrolytic cell, and the metal is easily recovered in a pure condition by evaporating off the ammonia.

Solutions of the third group deposit solid metal instead of yielding solutions of alkali metal.

The number of sodium or alkali metal salts which yield suitable electrolytic solutions is limited. The majority are either insoluble or so sparingly soluble in ammonia that only solutions of the first group are obtainable. Sodium chloride and bromide for example, yield solutions of this first group only.

Other salts which are sufficiently soluble cannot be used because they are not inert, i. e. they react with sodium or other alkali metal; the nitrates and thio cyanates are examples.

Sodium cyanide and sodium iodide are sufficiently soluble to yield solutions of groups two and three. They do not react with sodium in presence of liquid ammonia and the solutions are good conductors of electricity but I prefer the cyanide since there is a danger of forming explosive products in certain cases when using the iodide.

The alkali metal amalgam may be of any strength. The most suitable strength in any case would be determined by its cost of production. The very dilute, liquid amalgams which are easily obtained are preferred. In using these the current density at the anode must be proportioned to the alkali metal content of the amalgam and to its rate of movement; if too high current density is employed mercury dissolves as well as alkali metal and the production of the latter is diminished. So far my experiments have indicated that (with sodium amalgam for example) an anodic current density of 3 or 4 amperes per square centimetre for each 1 per cent of sodium in a stationary amalgam is safe but very much higher current densities can be employed if the amalgam is stirred or flows in a thin sheet; if these critical current densities are surpassed mercury dissolves, when the production of sodium may stop. The current density at the cathode may be quite small as compared with processes in which fused salts are electrolyzed.

The cathode is suitably made of wrought iron or mild steel, but many other materials which conduct electricity and are not acted on by the substances present in the cell are available, e. g. Monel metal is suitable. The cathode should remain substantially unaltered. Cast iron, platinum and mercury, for example, are unsuitable or undesirable for various reasons. Metals which accelerate the normally very slow reaction between alkali metals and ammonia to form amide should be avoided. Metals such as lead which form alloys with alkali metal should be avoided since the metal is to be isolated as such or after evaporation of the solution. Sodium itself is suitable if the solid metal is being made.

The portions of the containing vessel which come into contact with alkali metal solutions should be made of a material such as ebonite, glass, enamelled iron or copper, which does not catalyze the reaction forming the metal amide. Thus if a solution of alkali metal in ammonia in presence of a solution of a salt is allowed to come in contact with steel, the reaction forming metal amide may be so catalyzed as to yield amide almost entirely which may separate from solution as a suspension. The liquid may be drawn off with the amide.

In choosing a suitable electrolytic solution, it should be noted that the range of possible solutions varies with the temperature. As the weak solutions are very deeply coloured, the desired lack of homogeneity must be ascertained by the analysis of samples drawn off from the bottom and the top of the liquid. At about —26° C. for example, the range in which two liquid phases are formed is from about 3% sodium cyanide to about 44% sodium cyanide i. e. 44 parts of sodium cyanide per 100 parts of solution. In the manufacture of sodium by electrolyzing these solutions with a sodium amalgam anode the best results are obtained with the concentrated solutions containing above 17% and preferably between 28% and 41% of sodium cyanide. Below 17% it is almost essential to use a diaphragm to hinder the contact of dissolved sodium with amalgam. The sodium obtained usually contains a little cyanide especially if the concentration of cyanide is low.

Above 41% small variations in ammonia content may cause the deposition of solid sodium.

The process may be performed at various temperatures. Very low temperatures cannot be used, partly on grounds of economy, partly because the electrolyte may solidify more or less completely. For example, certain solutions of sodium cyanide in ammonia freeze at —31° C. A satisfactory range of temperature within which the process can be worked is therefore approximately from —30° C. to +30° C.

The invention will be described more fully with reference to the following examples to which the invention is not limited. The accompanying drawing diagrammatically illustrates a suitable apparatus.

*Example 1.*

Sodium from a dilute cyanide solution.

A solution of 15 grammes NaCN in 100 grammes anhydrous liquid ammonia is electrolyzed with a cathode of mild steel or wrought iron and an anode of sodium amalgam (initially 0.05%) at atmospheric pressure and at a temperature between the freezing and boiling points of the solution, i. e. between —40° C. and —31.5° C. or thereabouts. The anodic current density may be 0.04 amp. per cm$^2$ and the amalgam is kept in motion by stirring or preferably by causing it to flow through a cell in a thin sheet at such a rate that the sodium in it is removed almost completely during its passage, the exit amalgam containing .01% of sodium or less, according to the rate of flow.

The cyanide solution becomes deep blue owing to solution of the sodium formed at the cathode, and soon separates into two layers which are hardly distinguishable by their appearance. The current efficiency is low owing to contact of the amalgam with the deep blue solution of cyanide and sodium. When the solution is allowed to boil, which promotes contact, I have obtained only 0.2 grammes of sodium per amp. hr. The upper layer contains 9.5 grammes sodium and 0.41 grammes of sodium cyanide in 100 grammes of ammonia; it is run off by means of a cold separator, the ammonia and cyanide so removed from the cell being continuously replaced by feeding in a solution of cyanide in ammonia of suitable strength. The sodium solution is collected in a suitable vessel which is maintained by external cooling at a low temperature (about —30° C.) from this it is transferred to an evaporator, which may be of mild steel, and which is connected to a condenser and receiver for liquid ammonia. The ammonia solution in the evaporator is then distilled as rapidly as possible so that the ammonia evolved condenses under its own pressure. The solid left in the evaporator consists of sodium mixed with 2.7% of its weight of sodium cyanide and a little sodium amide formed by the reaction of sodium and ammonia catalyzed by contact with the steel vessel at the relatively high temperatures used in the evaporation. The sodium is fused at the lowest possible temperature when the greater part of it can be run off in a pure condition. The small residue which is not run off is a valuable product, which is readily utilized by known methods.

Referring now to the drawing, the electrolyte is contained in a cast iron vessel 1 the upper part of which is protected by ebonite lining 2. Current is supplied at 3 so that the amalgam is the anode and a perforated steel plate 4 serves as cathode; this plate is insulated at 5. The amalgam flows in through pipe 6 and out through pipe 7. Liquid anhydrous ammonia is supplied through valve 9 to container 8. Ammonia gas passes along pipe 10 and may be drawn off at 16. The upper liquid layer (sodium solution) collects in vessel 11 overflowing into vessel 12. The sodium solution is withdrawn through pipe 14 into vessel 15, and can be removed through valve 17. Any cyanide solution overflowing with the sodium solution is returned through pipe 13. The apparatus may be under pressure if required. The cooling jackets (necessary especially to vessel 12) are not illustrated.

*Example 2.*

A solution of 50 parts of sodium cyanide in 100 parts of liquid anhydrous ammonia is electrolyzed at atmospheric pressure and at temperatures lying between the freezing and boiling points of the solution (—31° C. to —28° C.) using an anode of sodium amalgam and a cathode of a metal which is substantially without catalytic action on the reaction between sodium and ammonia and which is unchanged under the conditions prevailing, for example, low carbon steel. The current density at the anode may be 0.06 amp. per cm$^2$. and the exhausted amalgam may be rejected with a minimum content of 0.002% of sodium if the speed of flow of amalgam is 200 cm. per min. A greater velocity of flow permits a higher current density or a lower exit concentration and vice versa. The current efficiency is substantially theoretical. The sodium collects as a bronze coloured solution in ammonia substantially free from cyanide which floats on the electrolyte; the latter usually remains colourless. The bronze solution is run off, without admixture of cyanide solution, by means of a suitable cooled separator, the ammonia so abstracted from the cell being replaced. The metal is recovered in a pure condition by evaporating the bronze solution, at atmospheric pressure to dryness. The ammonia evolved is dealt with by well known methods. The residual solid sodium is in the form of a dense sponge which is rather prone to oxidation; it is, therefore, suitably fused at the lowest temperature possible and while still exposed to the atmosphere of ammonia left in the evaporator is run off into moulds.

The evaporation may also be carried out under pressure as described in Example 1.

The parts of the electrolytic cell which come in contact with the sodium solution are constructed of materials which do not catalyze the reaction of sodium with ammonia.

Example 3.

A solution of 60 grammes of sodium cyanide in 100 grammes of liquid anhydrous ammonia is electrolyzed in a cell the walls of which are capable of withstanding internal pressure, at a temperatures of 10° C. to 30° C. It is of special importance in this case that the portions of the apparatus which come in contact with the sodium solutions shall be made of materials which do not catalyze the reaction between sodium and ammonia, the velocity of which is much greater at the higher temperature. Glass or vitrified enamel, ebonite, copper and Monel metal are examples of suitable materials. The cathode is of copper or of Monel metal, the anode of sodium amalgam which is suitably pumped into the cell or allowed to flow into it by gravity from a suitable height, the exhausted amalgam flowing out similarly. Sodium solution is produced in the way described in Example 2 except that at the higher temperature it has an appreciable very small solubility in the cyanide solution which is therefore coloured blue. The small solubility has no material effect on the efficiency of the process.

The solution of sodium in ammonia overflows continuously as it is produced, through a separator, into an evaporator in which the ammonia is vaporized by heat and recondensed under its own pressure by a water-cooled condenser from which it returns to the cell replacing the loss due to removal of the sodium solution. When a sufficient quantity of sodium has accumulated in the evaporator the flow of solution to it is stopped, the metal heated until fused and the pure fused metal run off into moulds.

Since at the cathode ammonia is abstracted from the cyanide solution increasing its concentration—means must be provided for mixing this concentrated solution with the liquid ammonia returned to the cell. This is most simply done by adjusting the pressure on the cell so that the solution is kept in gentle ebullition. Thermo-siphon circulation is also easily arranged.

Example 4.

A solution of potassium iodide in anhydrous ammonia, containing not less than 0.6 gram (preferably 0.7 gram) of potassium iodide per cubic centimeter of solution, is electrolyzed with a copper cathode and a potassium amalgam anode (0.05%). The solution is at or slightly below its boiling point at atmospheric pressure. Potassium is removed from the amalgam and forms at the cathode a bronze coloured solution of potassium in ammonia. The bronze liquid rises from the cathode to the surface of the iodide solution where it accumulates, and is easily drawn off continuously and without admixture of iodide solution, by means of a suitable separator which is kept at a temperature below that at which the solution boils.

The impoverished amalgam is withdrawn from the cell and replaced by fresh amalgam. If the amalgam drawn off contains 0.01% of potassium the current density at the anode may be 0.03 amp. per sq. cm. The potassium solution may be evaporated at atmospheric pressure, which minimizes the loss by reaction with ammonia to potassamide. The residual metal is somewhat spongy; it is fused at as low a temperature as possible and run off into moulds in a pure state.

If a solution of iodide considerably more dilute than that specified is used, no potassium is obtained, but only potassamide.

In general I have described the separation of the two liquid layers or phases as being effected by gravity, if necessary after settling quietly in a separate vessel but other means of separation could be employed. The word "layer" is used although if the liquid in the cell is boiling, the two layers will be intermixed rather than superimposed.

In the following claims, I use the term inert to signify that neither the solvent nor the dissolved salt react on the alkali metal (in absence of a catalyst) to a sufficient extent under working conditions to prevent successful commercial isolation of the metal. I use the term volatile to limit the term "solvent" by exclusion of fused salts; the solvent must be a liquid which can be separated easily from the alkali metal by distillation or evaporation. Obviously the word solvent implies that the liquid in question is capable of dissolving the inert salt.

I declare that what I claim is:—

1. The process of removing alkali metal from an amalgam thereof which comprises passing a current from the alkali metal amalgam as anode to a cathode through a solution of an inert alkali metal salt in an inert volatile solvent such solution being of such concentration that when alkali metal is supplied thereto the solution forms two liquid layers of which the layer out of contact with the amalgam is relatively more concentrated in alkali metal and less concentrated in alkali metal salt than the layer in contact with the amalgam.

2. The process of containing a solution of alkali metal in an inert volatile solvent which comprises passing a current from an amalgam of said metal as anode to a cathode through a solution in the inert volatile solvent of an inert alkali metal salt in such concentration that the supply of alkali metal thereto produces one liquid layer containing practically all the inert salt and another liquid layer containing practically all the alkali metal and removing one of the layers so formed.

3. The process of obtaining an alkali metal which comprises passing a current from an amalgam of said metal as anode to a cathode through a solution of an inert alkali metal salt in an inert volatile solvent such solution being of such concentration that the supply of alkali metal thereto causes the formation of two liquid layers, one of which consists of a solution of alkali metal with little or no alkali metal salt, removing one of said layers and evaporating the solution of alkali metal to remove the solvent and obtain the alkali metal.

4. The continuous process of obtaining an alkali metal which comprises causing an alkali metal amalgam to flow as anode in contact with a solution of an inert alkali metal salt in an inert volatile solvent such solution being of such composition that two liquid layers are produced, passing current between said anode and a cathode, removing a liquid layer containing dissolved alkali metal and replacing the material so removed with the alkali metal.

5. The process of removing sodium from an amalgam thereof which comprises passing a current from the sodium amalgam as anode to a cathode through a solution of an inert sodium salt in liquid anhydrous ammonia, such solution being of such concentration that when sodium is supplied thereto the solution forms two liquid layers of which the layer out of contact with the amalgam is relatively more concentrated in sodium and less concentrated in sodium salt than the layer in contact with the amalgam.

6. The process of obtaining a solution of sodium in liquid anhydrous ammonia which comprises passing a current from an amalgam of sodium as anode to a cathode through a solution in liquid anhydrous ammonia of an inert sodium salt in such concentration that the supply of sodium thereto produces one liquid layer containing practically all the inert salt and another liquid layer containing practically all the sodium, and separating said layers, all while avoiding the formation of sodamide by preventing substantial catalysis of the reaction between sodium and ammonia.

7. The process of obtaining sodium which comprises passing a current from a sodium amalgam as anode to a cathode through a solution of an inert sodium salt in liquid anhydrous ammonia, such solution being of such concentration that the supply of sodium thereto causes the formation of two liquid layers, one of which consists of a solution of sodium with little or no sodium salt, removing one of said layers and evaporating the solution of sodium to remove the solvent and obtain the sodium, all while avoiding the formation of sodamide by preventing substantial catalysis of the reaction between sodium and ammonia.

8. The continuous process of obtaining sodium which comprises causing a sodium amalgam to flow as anode in contact with a solution of an inert sodium salt in liquid anhydrous ammonia such solution being of such composition that two liquid layers are produced, passing current between said anode and a cathode, removing a liquid layer cointaining dissolved sodium and replacing the liquid anhydrous ammonia, all while avoiding the formation of sodamide by preventing substantial catalysis of the reaction between sodium and ammonia.

9. The process of removing alkali metal from an amalgam thereof which comprises passing a current from the alkali metal amalgam as anode to a cathode through a solution of an inert alkali metal salt in liquid anhydrous ammonia such solution being of such concentration that when alkali metal is supplied thereto the solution forms two liquid layers of which the layer out of contact with the amalgam is relatively more concentrated in alkali metal and less concentrated in alkali metal salt than the layer in contact with the amalgam.

10. The process of obtaining a solution of alkali metal in liquid anhydrous ammonia which comprises passing a current from an amalgam of said metal as anode to a cathode through a solution in liquid anhydrous ammonia of an inert alkali metal salt in such concentration that the supply of alkali metal thereto produces one liquid layer containing practically all the inert salt and another liquid layer containing practically all the alkali metal, and removing one of the layers so formed, all while avoiding formation of metal amide by preventing substantial catalysis of the reaction between alkali metal and ammonia.

11. The process of obtaining an alkali metal which comprises passing a current from an amalgam of said metal as anode to a cathode through a solution of an inert alkali metal salt in liquid anhydrous ammonia, such solution being of such concentration that the supply of alkali metal thereto causes the formation of two liquid layers, one of which consists of a solution of alkali metal with little or no alkali metal salt, removing one of said layers and evaporating the solution of alkali metal to remove the solvent and obtain the alkali metal, all while avoiding formation of metal amide by preventing substantial catalysis of the reaction between alkali metal and ammonia.

12. The continuous process of obtaining an alkali metal which comprises causing an alkali metal amalgam to flow as anode in contact with a solution of an inert alkali metal salt in liquid anhydrous ammonia such solution being of such composition that two liquid layers are produced, passing current between said anode and a cathode, maintaining a liquid layer containing dissolved alkali metal out of contact with catalytic surfaces, removing said layer, and replacing the liquid anhydrous ammonia.

13. The process of removing sodium from an amalgam thereof which comprises passing a current from the sodium amalgam as anode to a cathode through a solution of sodium cyanide in liquid anhydrous ammonia, such solution being of such concentration that when sodium is supplied thereto the solution forms two liquid layers of which the layer out of contact with the amalgam is relatively more concentrated in sodium and less concentrated in sodium cyanide than the layer in contact with the amalgam.

14. The process of obtaining a solution of sodium in liquid anhydrous ammonia which comprises passing a current from an anode of sodium amalgam to a cathode through a solution in liquid anhydrous ammonia of sodium cyanide in such concentration that the supply of sodium thereto produces one liquid layer containing practically all the sodium cyanide and another layer containing practically all the sodium, and removing one of the said layers, all while avoiding formation of sodamide by preventing substantial catalysis of the reaction between sodium and ammonia.

15. The process of obtaining sodium which comprises passing a current from a sodium amalgam as anode to a cathode through a solution of sodium cyanide in liquid anhydrous ammonia, such solution being of such concentration that the supply of sodium thereto causes the formation of two liquid layers, one of which consists of a solution of sodium with little or no sodium cyanide, removing one of said layers and evaporating the solution of sodium to remove the solvent and obtain the sodium, all while avoiding formation of sodamide by preventing substantial catalysis of the reaction between sodium and ammonia.

16. The continuous process of obtaining sodium which comprises causing a sodium amalgam to flow as anode in contact with a solution of sodium cyanide in liquid anhydrous ammonia such solution being of such composition that two liquid layers are produced, passing current between said anode and a cathode, maintaining a liquid layer containing dissolved sodium out of contact with catalytic surfaces removing the said layer and replacing the liquid anhydrous ammonia.

17. The process for treating alkali metal amalgams which comprises passing a current from said amalgam as anode to a cathode through a solution of an inert alkali metal salt in an inert volatile solvent, such solution being of such composition that two liquid layers are formed, and drawing off a liquid from that layer which is out of contact with the amalgam.

18. The process for treating alkali metal amalgams which comprises passing a current from said amalgam as anode to a cathode through a solution of an inert alkali metal salt in an inert volatile solvent, such solution being of such composition that two liquid layers are formed, and drawing off continuously a liquid from that layer which is out of contact with the amalgam and simultaneously supplying fresh solvent.

19. The process of obtaining a solution of an alkali metal in liquid anhydrous ammonia which comprises electrolyzing an aqueous solution of an alkali metal salt with a mercury cathode to produce an amalgam and passing current between said amalgam as anode and a cathode through a solution of an inert alkali metal salt in liquid anhydrous ammonia such solution being of such composition as to produce two liquid layers.

20. The process of removing sodium from sodium amalgam by passing current between a cathode and said amalgam as anode through a solution of sodium cyanide in liquid anhydrous ammonia such solution being of such composition as to produce two liquid layers, one of which layers contains practically all the sodium removed from said amalgam.

21. The process of removing sodium from sodium amalgam by passing a current between a cathode and said amalgam as anode through a solution of sodium cyanide in liquid anhydrous ammonia, such solution being of such composition as to produce two liquid layers, one of which layers contains practically all the sodium, and then removing said layer and evaporating it to give metallic sodium.

22. The process of obtaining sodium which consists in passing current between a sodium amalgam as anode and a cathode through a solution of sodium cyanide in liquid anhydrous ammonia, such solution being of such composition as to produce two liquid layers and drawing off a liquid containing dissolved sodium.

23. An apparatus suitable for the electrolytic manufacture of alkali metal comprising the combination of a cell adapted to contain a solution of an inert salt in a low-boiling volatile solvent and to prevent loss of such solvent whose exposed surfaces consist of a non-catalytic material, means to supply solvent thereto, means to supply a liquid alkali metal amalgam to form an anode, means to remove the spent amalgam, a cathode, electrical connections for said anode and said cathode, and means to separate metal solution from the salt solution immiscible therewith.

In witness whereof, I have hereunto signed my name this 13 day of March, 1924, in the presence of two subscribing witnesses.

THOMAS EWAN.

Witnesses:
GEORGE E. CHAMBERLIN,
DAVID C. H. KENNEDY.